United States Patent [19]

Maestrello

[11] 4,398,667
[45] Aug. 16, 1983

[54] APPARATUS AND METHOD FOR JET NOISE SUPPRESSION

[75] Inventor: Lucio Maestrello, Newport News, Va.

[73] Assignee: The United States of America as represented by the Administrator of the National Aeronautics and Space Administration, Washington, D.C.

[21] Appl. No.: 238,791

[22] Filed: Feb. 27, 1981

Related U.S. Application Data

[63] Continuation of Ser. No. 753,971, Dec. 23, 1976, abandoned.

[51] Int. Cl.³ .............................................. B63H 25/46
[52] U.S. Cl. ................................................. 239/265.17
[58] Field of Search ..................... 239/265.13, 265.17, 239/265.19, 265.29; 181/33 HC, 33 B, 33 HB

[56] References Cited

U.S. PATENT DOCUMENTS

| | | | |
|---|---|---|---|
| 3,153,319 | 10/1964 | Young et al. | 239/265.13 X |
| 3,575,260 | 4/1971 | Urguhart | 239/265.13 X |
| 3,739,984 | 6/1973 | Tontini | 239/265.19 X |
| 3,815,356 | 6/1974 | Burge et al. | 239/265.17 X |

FOREIGN PATENT DOCUMENTS 1268781  6/1961  France ........................... 239/265.17

Primary Examiner—Jeffrey V. Nase
Assistant Examiner—Gene A. Church
Attorney, Agent, or Firm—Wallace J. Nelson; John R. Manning; Howard J. Osborn

[57] ABSTRACT

A method and apparatus for jet noise suppression through control of the static pressure of the jet and control of the rate of entrainment of ambient fluid into the jet downstream of the exhaust nozzle is disclosed and serving to regulate the momentum flux over an extended region of the jet, affecting Reynolds stresses in the jet and the spreading angle of the jet. Static pressure is controlled through a long hollow, porous nozzle plug centerbody which may be selectively vented to ambient conditions, connected to a vacuum source, or supplied with fluids of various densities for injection into the stream. Additionally, sound in the jet may be channeled along the nozzle plug centerbody by injecting coolant such as a cryogenic fluid through the center-body into the jet.

17 Claims, 5 Drawing Figures ns and Space Adminis-
APPARATUS AND METHOD FOR JET NOISE SUPPRESSION

ORIGIN OF THE DISCLOSURE

The invention herein described was made by an employee of the National Aeronautics and Space Administration and may be manufactured and used by or for the Government of the United States of America for governmental purposes without the payment of any royalties thereon or therefor.

This is a continuation of application Ser. No. 753,971, filed Dec. 23, 1976, now abandoned.

BACKGROUND OF THE INVENTION

This invention relates to an apparatus and method for jet noise suppression involving control of the static pressure of the jet and control of the rate of entrainment of ambient fluid into the jet downstream of the exhaust nozzle, and more particularly, includes a long hollow, porous or perforated nozzle plug centerbody through which the static pressure in the jet may be controlled. As used herein, the term "jet" refers to a strong, well-defined stream of fluid issuing from an orifice and producing noise. The prior art includes devices which deflect the flow within the exhaust nozzle and devices which, by injection or suction in the nozzle proper, seek to vary flow mixing between the jet and the surrounding air. However, these devices are designed to mechanically alter flow properties directly at various locations in the nozzle rather than altering the entire flow field of the jet to control momentum flux downstream of the nozzle.

Preliminary studies have indicated that effective jet noise suppression requires altering of the flow over an extended region of the jet to provide positive control over the momentum change between the jet and the induced flow of ambient air. Since the variation of the momentum flux in the jet field is related through the momentum equations to the Reynolds stresses which are the source of sound, control of static pressure in the jet field is directly related to noise suppression.

Prior art jet noise suppressors have enjoyed limited success. Devices which mechanically altered nozzle flow by modifying nozzle configuration have not significantly reduced jet noise and have definite disadvantages of weight and thrust loss. The various suction/injection devices do not affect the entire flow field of the jet and lack adjustment parameters which could allow continuous efficient operation over a range of jet exit velocities and mass flows. Many of these devices also suffer from increased wave drag and needless sacrifice in propulsive efficiency and fuel economy. Public demand for quiet engines in commercial jet aircraft has grown together with an equally pressing demand for fuel economy in the transportation sector. A jet noise suppressor to be acceptable must also be fuel efficient.

Accordingly, it is an object of the present invention to provide an apparatus and method to suppress jet noise by control of the static pressure in the jet to produce a uniform rate of change of momentum in the jet.

Another object of the present invention is to provide an apparatus and method to suppress jet noise by controlling the rate of ambient fluid entrained into the jet to produce a uniform rate of change of momentum in the jet.

Another object of the present invention is to achieve jet noise suppression through a method and an apparatus which are simple, effective, fuel efficient, lightweight, controllable, and adjustable to engine mass flow conditions.

A further object of this invention is to provide an apparatus and method to permit thrust vectoring.

A further object of this invention is to provide an apparatus and method to improve engine performance by repositioning, weakening or eliminating shock waves formed in and downstream of the engine exhaust nozzle.

An additional object of the present invention is to provide an apparatus and method for sound vectoring in a jet.

SUMMARY OF THE INVENTION

This novel apparatus and method of jet noise suppression achieves the above and other objects by altering the flow over an extended region of the jet through control of the static pressure of the jet and control of entrainment of the air surrounding the jet beyond or downstream of the exhaust nozzle. This static pressure control is effected in one embodiment of the present invention by a long hollow porous or perforated nozzle plug centerbody which may be vented to ambient conditions, connected to a vacuum source, or supplied with fluids of various densities and pressure for injection into the jet.

Since the porous or perforated centerbody projects rearward for some distance beyond the exhaust nozzle, it can control the static pressure in the jet, the rate of entrainment of ambient air into the jet and allow uniform momentum charges along the jet for significant distances downstream of the nozzle. Deflection of the centerbody results in vectored thrust through the action of Coanda forces and through the flow effects of static pressure control. Also, by injecting a coolant such as a cryogenic fluid into the jet through the porous centerbody, sound may be directed along the centerbody in a desired direction.

Changes in the static pressure of the exhaust flow and the insertion of the centerbody in the nozzle will cause some net loss in engine efficiency. But only one half of one percent thrust loss is presently anticipated during suction flow control. Moreover, even this small loss may be regained through extension/retraction of the centerbody and control (shut-off) of the suction source during cruise regimes where noise suppression consideration may be outweighed by a need for fuel economy. Adding fluid to the jet will enhance performance, although a lightweight or thrust penalty will be incurred in producing or carrying the added fluid. Afterburning engines and engines producing shock waves in and downstream of the exhaust nozzle will derive an increase in performance along with significant noise reduction by repositioning, eliminating or weakening the shock through downstream static pressure control. This would be of particular benefit to afterburning supersonic military and commercial aircraft during operations at airfields near population centers.

Static pressure sensors on the nozzle plug centerbody provide indication of engine performance or thrust and noise suppression control in much the same fashion as present-day engine pressure ratio (EPR) gage sensors. Pilots and flight engineers could have direct readout of static pressure in the jet to indicate both noise suppression effectiveness and any engine enhancement or degradation. Emergency override of static pressure reduction during critical phases of flight, such as during takeoff, would allow use of an emergency reserve of engine thrust as would momentary injection of higher density fluid into the jet. Pressure sensors already in use in turbojet fuel control systems could also be used to automaticaly regulate jet static pressure throughout the upper thrust range.

DESCRIPTION OF THE PREFERRED EMBODIMENT

Figure 1:
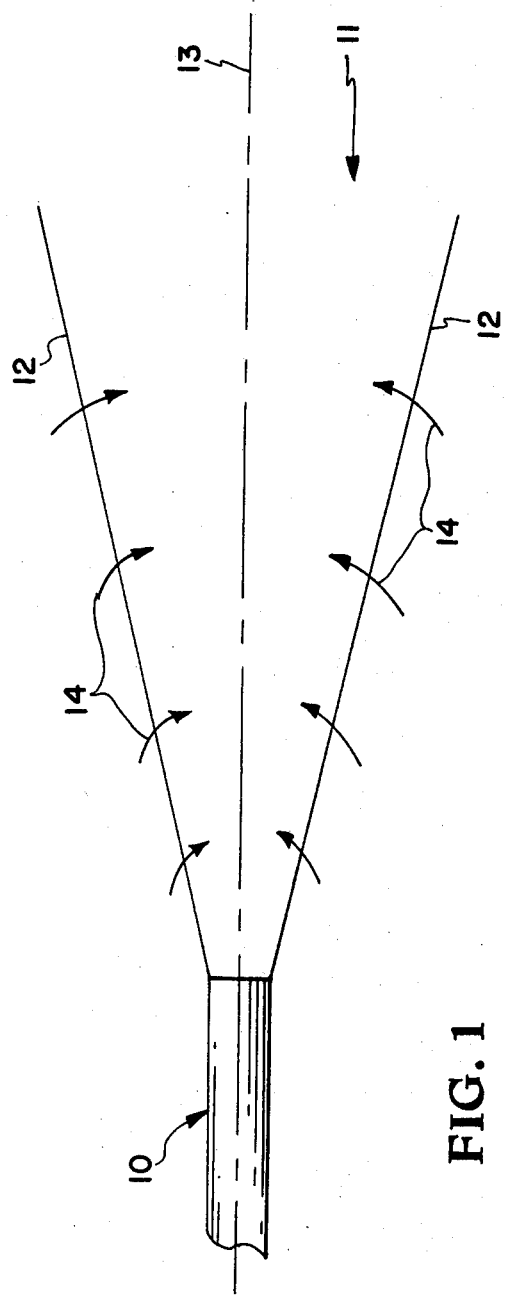
FIG. 1 is a schematic view of a jet issuing from an exhaust nozzle.

Referring now to the drawings, FIG. 1 schematically shows a jet 11 having a boundary 12 and axis 13 issuing from an exhaust nozzle 10 into ambient conditions. Since the static pressure in the jet is less than ambient conditions, ambient air is entrained into the jet as schematically represented by the arrows 14 crossing the jet boundary 12. The rate of this entrainment increases from near the exhaust nozzle to a point downstream where the entrained air enters the jet at an angle normal to the jet axis 13. Thereafter, entrainment rate is a constant value downstream of the nozzle exit. As the surrounding ambient fluid is entrained into the jet, the momentum in the jet flow changes, reflecting similar changes in Reynolds' stresses in the jet, the source of sound. Further downstream, momentum changes continue until a steady state ambient conditions are reestablished.

Figure 2:
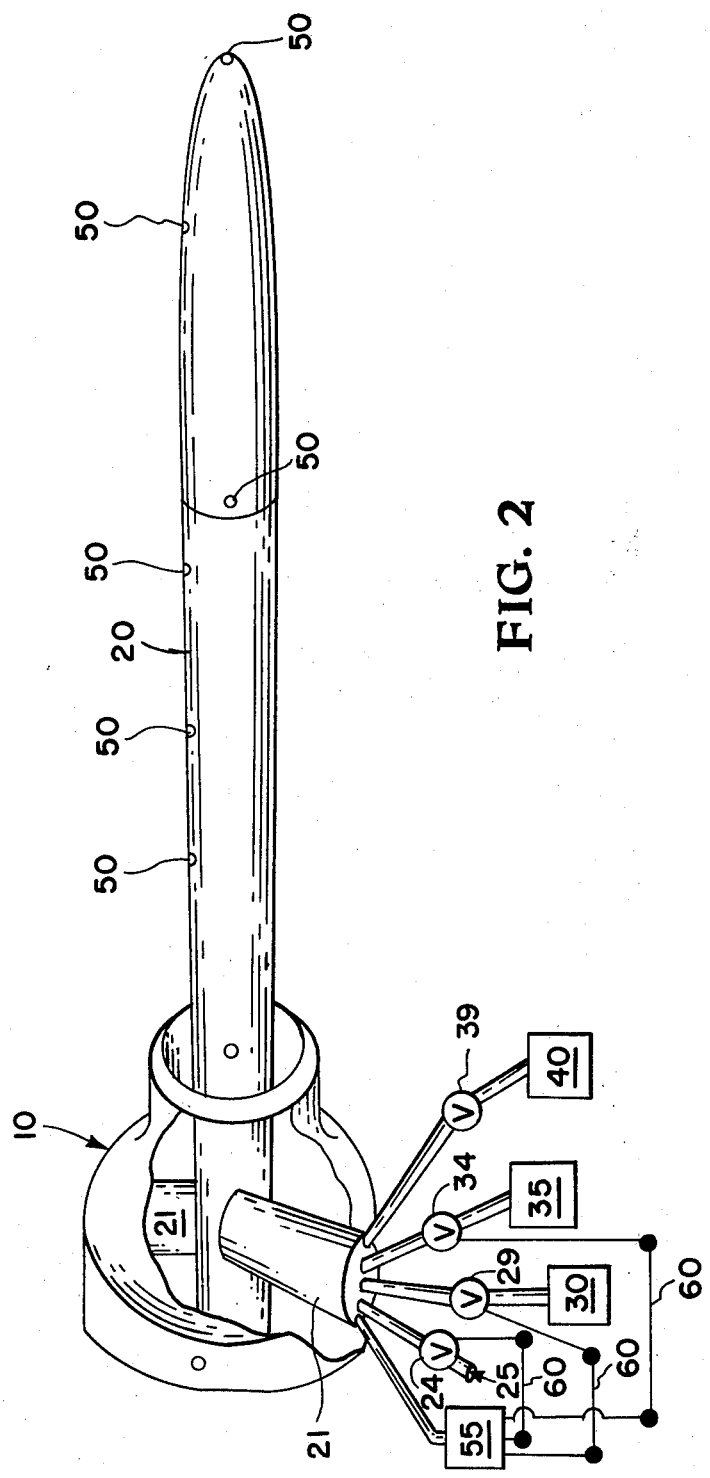
FIG. 2 is an elevational view of the hollow, porous centerbody of the noise suppressor of the present invention.

FIG. 2 shows one embodiment of the present invention providing novel jet noise suppression where a long, hollow nozzle centerbody 20 extends rearward from within a primary jet exhaust nozzle 10. Porous nozzle plug centerbody 20 is supported in exhaust nozzle 10 by struts 21. This porous centerbody is connected through plumbing and valving 24, 29, 34 and 39 to an ambient pressure source 25, a suction of vacuum source 30, a pessurized fluid source 35 and a source of cryogenic fluid 40, respectively. Some embodiments of the invention may use less than all of these sources. For example, a certain turbojet engine may require only ambient source 25 while an afterburning turbo engine may use cryogenic source 40, and so forth. Porous material is preferred for centerbody 20 for homogenous mixing. The porosity of centerbody 20 must allow flow through the centerbody equivalent to 10-15% of the jet mass flow rate. In this way, the static pressure in the jet is varied to maintain an energy balance which minimizes noise.

Cryogenic fluid may be released into the jet to creat a heat sink near the jet axis channeling sound along this axis. This coolant is released through porous centerbody 20. Pressure sensors 50 are used to monitor static pressure levels in the jet. A computer 55 compares this static pressure measurement with that desired at a given jet mass flow and operates valves 24, 29 and 34 to produce automatic jet static pressure control.

Figure 3:
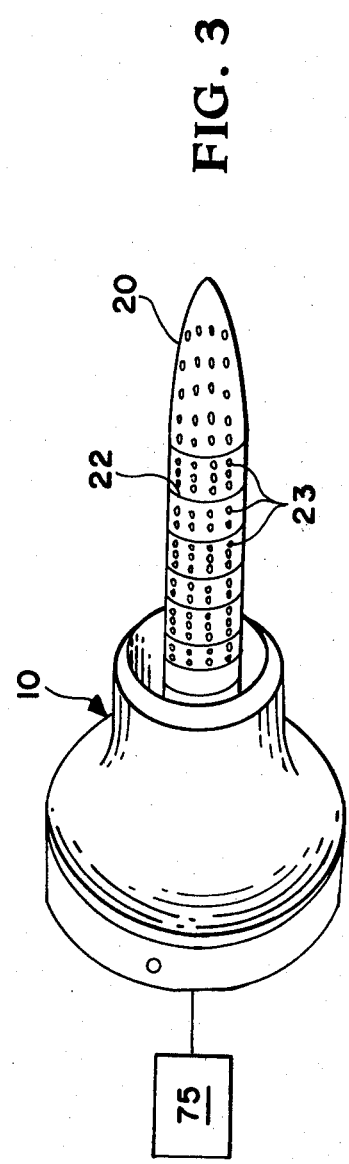
FIG. 3 is an elevational view of the hollow, porous centerbody shown in FIG. 2 when partially retracted.

As shown in FIG. 3, the nozzle plug centerbody 20 may include segments 22 which are telescoped or retracted by retractor mechanism 75 and valves 24, 29, 34 and 39 shown in FIG. 2 may be closed during cruising flight at an altitude, geographic area or thrust setting where noise suppression is not needed. Retractor mechanism 75 may be electrical, pneumatic, or hydraulic and in one application includes wires and pulleys to retract and extend centerbody 20. The centerbody 20 is hollow and would incur substantially no weight penalty. In operation, suction source 30, pressurized fluid source 35, and cryogenic source 40 (FIG. 2) would normally be pressure vessels serviced on the ground before flight and evacuated/replenished in flight for use during short takeoff and landing periods for high flying aircraft. However, in aircraft with flight profiles which require continuous noise suppression, pressure sources could run continuously off an auxiliary drive (suction source) or the engine compressor section (pressure source) which, for brevity, are not shown. In lieu of a porous material, perforations 23 could be used provided the same flow rate through centerbody is obtained. Perforations 23 must be small enough to avoid shear in the flow increasing the skin friction drag of centerbody 20 and numerous enough to permit flow through center body 20 which is equivalent to 10 to 15 percent of jet mass flow.

Figure 4:
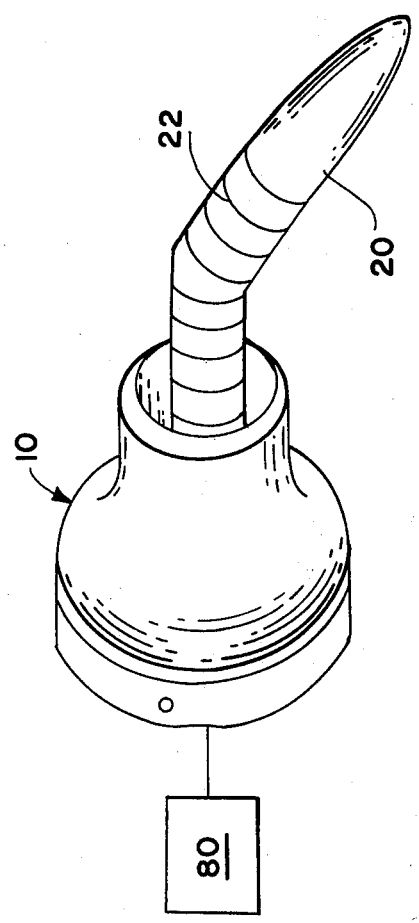
FIG. 4 is an elevational view of an inclined porous centerbody.

STOL aircraft might use a variation of the telescoping technique by bending or inclining segments 22 of nozzle centerbody 20 as shown in FIG. 4. Inclining mechanism 80 may be electrically, pneumatically or hydraulically operated and in one application includes wire and pulleys moved differentially to bend centerbody 20. Coanda forces aided by the suction or pressurization of noise suppression static pressure control deflects the jet as shown to give a downward thrust vector. Cryogenic injection into the jet through the inclined nozzle centerbody could also be used for vectoring jet noise in a desired direction. Turbojet thrust reversers in current use would not be affected by the presence of the nozzle centerbody except for necessary contouring to avoid physical interference. Afterburning or external combustion engines might require the use of high temperature metals and even active cooling and heat exchangers in the suction mode of static pressure control, but the performance increase expected due to repositioning, eliminating or weakening the shock waves in the exhaust of such engines would justify additional weight.

Figure 5:
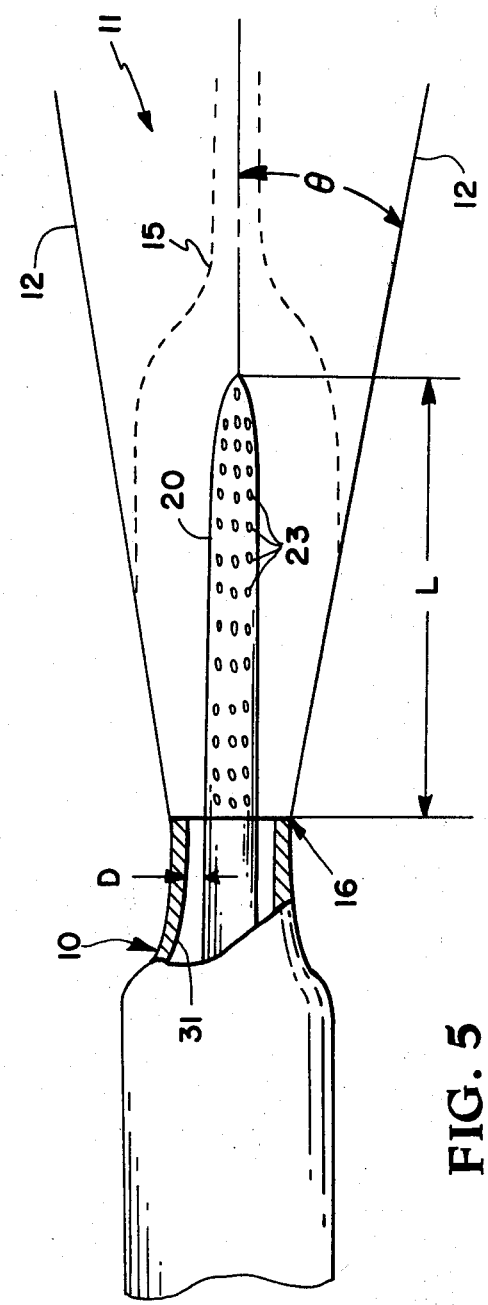
FIG. 5 is a partial sectional view and part schematic view of a jet stream issuing from a nozzle including a porous nozzle plug centerbody.

FIG. 5 schematically shows the novel centerbody 20 with perforations 23 extending downstream from exhaust nozzle 10 into a jet 11. The spreading angle of the jet, designated $\theta$, is affected by suction and injection of fluid through centerbody 20. $\theta$ decreases when fluid is removed from the jet, while adding fluid to the jet via centerbody 20 increases $\theta$. Injecting a coolant such as a cryogenic fluid into the jet through the perforations 23 in centerbody 20 creates a heat sink in the jet which attracts acoustical energy and channels and directs the sound in the jet according to the acoustical boundary (shown by dotted line 15) in the jet. The average distance between the outer surface of the centerbody 20 and the interior wall 31 of the exhaust nozzle 10 measured at the jet exit 16 is designated by the letter D in FIG. 5. To effectively suppress sound in the jet, either by controlling static pressure in the jet or by controlling the rate of entrainment of ambient fluid into the jet, centerbody 20 should extend a distance L downstream of the jet exit which is equal to or greater than 10D. Extending the centerbody downstream in the jet at least 10D from the jet exit permits optimum noise suppression by controlling static pressure in the jet or controlling rate of entrainment of ambient fluid into the jet over the critical downstream distance. If a uniform rate of change of momentum can be established in a standard jet over this critical distance, noise reduction of up to ten decibels from, for example, 95 decibels to 85 decibels—can be expected in the peak noise frequency range 0.8 to 2.0 kilohertz (kHz), for a typical model jet.

OPERATION

From the foregoing description of the invention, operation is believed apparent. However, in the interest of clarity, further explanation follows with particular reference to FIG. 5. For each jet nozzle design, empirical adjustment of the novel static pressure control method is required. An existing jet exhaust 10 for an afterburning turbojet engine would require some enlargement and retrim to accommodate nozzle plug centerbody 20 and its support structure 21. Active cooling or ablation of centerbody 20 and parts of its support structure would be required during afterburner operation. Alternatively, cryogenic coolant injection as described hereinbefore could be used to protect centerbody 20 and direct the sound rearward when the afterburner is selected.

After mounting centerbody 20, extending the centerbody rearward at least 10D, as described, and providing protecting cooling as needed, adjustments may begin. Using pressure sensors and audiometers, centerbody extension and pressure change requirements throughout the thrust range of the engine, with and without afterburning can be determined. For the afterburning range, a prime consideration will be the repositioning, weakening or removal of the shock wave standing or moving in the exhaust nozzle and reflected back and forth across the jet. Compromises will be effected dependent upon the most serious noise producing problem; however, in the subsonic jet, the pressure gradient created between the jet and centerbody 20 along the length of the centerbody will be regulated to control the rate of ambient air entrained into the jet and the static pressure in the jet to produce a uniform rate of change of momentum over the course of the jet downstream of exhaust nozzle 10.

Empirical results or raw noise reduction, in decibels can be used for rough adjustment. For more precise adjustment, velocity measurements by hot wire anemometry may be made adjacent to the jet boundary 12 shown in FIG. 5. This jet boundary can be defined as that ideally conical surface on which the flow is turbulent one percent of the time. Jet boundary 12 will be as the spreading angle $\theta$ is affected by static pressure controls as previously described. Therefore, after rough adjustment and after each fine adjustment, a turbulence detector must be used to establish the location of the one percent turbulent boundary before proceeding. The end result should produce a uniform arate of change of momentum along the flow field downstream of the nozzle and result in minimum jet noise.

Directing the jet flow by inclining centerbody 20 relative to exhaust nozzle 10, or inducing a curvature in centerbody 20 as shown in FIG. 4, may be used to vector thrust or to vector the sound when sound vectoring via coolant injection is desired. These techniques depend upon particular design and operational criteria which are beyond the scope of the above method of noise suppression. Nevertheless, thrust and sound vectoring are an important part of the invention and may be dealt with operationally in empirical fashion. The maximum allowable amount of vectoring depends on the degree of curvature and length of centerbody 20, the mass flow of the jet, the temperature difference between the jet and the coolant along centerbody 20 and the pressure differential between the jet and the interior of centerbody 20 along its length.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A method of directing the sound in a jet comprising the steps of:
   (a) providing a jet exhaust nozzle;
   (b) providing a porous centerbody internally along the entire nozzle length with a portion thereof extending rearward from the exhaust nozzle and downstream in the jet;
   (c) injecting a cryogenic fluid coolant through the porous centerbody into the jet thereby;
   (d) creating a heat sink along the jet extending downstream of the exhaust nozzle whereby the heat sink will attract acoustical energy in the jet and channel the jet noise in the direction of the heat sink.

2. The method of claim 1 including the further step of controllably directing the centerbody portion extending rearward from the exhaust nozzle angularly relative to the nozzle to channel the jet noise in a desired direction.

3. A device for directing the sound in a jet comprising:
   a jet exhaust nozzle;
   means for creating a heat sink along the jet emanating from and extending downstream of said exhaust nozzle whereby acoustical energy in the jet will be attracted to the heat sink and channeled in the direction of said heat sink and,
   means for controllably directing the heat sink angularly relative to said nozzle to channel the noise in a desired direction.

4. A method of suppressing noise in a jet comprising the steps of:
   (a) providing a jet exhaust nozzle from which the jet exits;
   (b) providing an elongated porous member fixed within said nozzle and having a portion thereof projecting rearward from the center of said jet exhaust nozzle and downstream in the jet; thereby,
   (c) creating a pressure difference between the jet and the interior of the porous member to affect the static pressure in the jet downstream of the exhaust nozzle and influence the rate of entrainment of ambient fluid into the jet downstream of the exhaust nozzle.

5. The method of claim 4 including the further step of controllably inducing a curvature in the porous member downstream of the exhaust nozzle whereby the jet may be controllably directed away from a course normal to the exhaust nozzle.

6. The method of claim 4 including the further steps of telescopically extending the porous member downstream of the exhaust nozzle when maximum noise suppression is desired and retracting the porous member toward the interior of the exhaust nozzle when maximum propulsive efficiency and fuel economy is desired.

7. The method of claim 4 wherein the porous member is projected along the jet to a distance downstream from the jet exit equal to at least 10D, D being the average distance from the outer surface of the porous member fixed portion to the exhaust nozzle wall measured at the jet exit and wherein the step of creating a pressure difference is accomplished along the length of the porous member portion downstream of the jet exit.

8. A method of suppressing noise in a jet comprising the steps of:
(a) providing a jet exhaust nozzle from which the jet exits;
(b) providing an elongated substantially equal diameter hollow nozzle plug centerbody;
(c) extending the hollow nozzle plug centerbody rearward from the jet equal to at least 10D, D being the average distance from the outer surface of the centerbody to the exhaust nozzle wall measured at the jet exit;
(d) providing a pressure source for producing a pressure differential between the jet and the interior of the hollow centerbody along the length of the centerbody downstream of the jet exit to affect the static pressure in the jet stream and influence the rate of entrainment of ambient fluid into the jet downstream of the exhaust nozzle.

9. The method of claim 8 including the further steps of:
(a) telescopically extending the centerbody downstream of the exhaust nozzle when maximum noise suppression is desired;
(b) retracting the centerbody toward the interior of the exhaust nozzle when maximum propulsive efficiency and fuel economy is desired; and
(c) controllably inducing a curvature in the centerbody downstream of the exhaust nozzle whereby the jet may be directed in a desired course.

10. A method of suppressing noise in a jet operating in an ambient fluid comprising the steps of:
(a) providing a jet exhaust nozzle from which the jet exits;
(b) providing an elongated hollow nozzle plug centerbody supplied with perforations about the exterior surface thereof, the number and size of the perforations being related to the length of the centerbody and the maximum mass flow of the jet;
(c) extending a portion of the centerbody rearward from the exhaust nozzle to a distance downstream equal to at least 10D, D being the average distance from the outer surface of the centerbody portion within the exhaust nozzle to the exhaust nozzle wall measured at the jet exit;
(d) providing a pressure source for producing a pressure differential between the jet and the interior of the centerbody downstream of the jet; and
(e) regulating the pressure differential along the centerbody length to influence the rate of entrainment of the ambient fluid into the jet downstream of the exhaust nozzle.

11. The method of claim 10 including the further steps of:
(a) extending the centerbody downstream of the exhaust nozzle when maximum noise suppression is desired;
(b) retracting the centerbody toward the interior of the exhaust nozzle when maximum propulsive efficiency and fuel economy is desired; and,
(c) controllably inducing a curvature in the centerbody downstream of the exhaust nozzle whereby the jet may be controllably directed.

12. The method of claim 10 wherein the perforations through said centerbody permit flow therethrough equivalent to 10–15% of the jet mass flow rate.

13. A jet noise suppression device comprising:
a jet exhaust nozzle;
an elongated hollow member having a portion thereof fixed within said nozzle and a portion centrally extending in the jet downstream of said nozzle;
said hollow member being of a substantially constant diameter along the length thereof;
a porous wall serving as the exterior surface of said elongated hollow member on at least the portion thereof extending in the jet downstream of said nozzle; and,
pressure means connected to said elongated hollow member, said pressure means serving to affect the static pressure in the jet through said porous wall to influence the rate of entrainment of ambient fluid into the jet downstream of said exhaust nozzle.

14. A noise suppression device for a jet operating in an ambient fluid comprising:
a jet exhaust nozzle;
means for influencing the rate of entrainment of ambient fluid into the jet emanating from said nozzle;
said means including an elongated hollow porous nozzle plug centerbody member having a length thereof fixed within said nozzle and a length thereof extending downstream in the jet emanating from said jet exhaust nozzle; and
pressure means connected to said porous centerbody member.

15. A noise suppression device for a jet as in claim 14 wherein said pressure means is selected from the group consisting of,
(a) a pressurized fluid source;
(b) a vacuum; and
(c) the ambient fluid.

16. The jet noise suppressor of claim 15 including
means for selectively telescopically extending and retracting a length of said nozzle plug centerbody relative to said exhaust nozzle; and
means for deflecting a length of said nozzle plug centerbody to direct the jet in a desired path.

17. A device for suppressing noise in a jet flow containing at least one shock wave comprising:
a jet exhaust nozzle;
an elongated hollow porous member having a first length portion thereof fixed relative to the nozzle and a second length portion disposed within the jet flow extending downstream of said exhaust nozzle; and,
pressure means connected to said porous member to provide a pressure differential between the jet flow and porous member, said pressure means serving to affect the static pressure in the jet downstrream of said exhaust nozzle by homogenous mixing of the differential pressures through said porous member to dissipate any shock waves emanating from within said exhaust nozzle.

* * * * *